(12) United States Patent
Sorrentino

(10) Patent No.: US 11,772,206 B2
(45) Date of Patent: Oct. 3, 2023

(54) HIGH CHROMIUM CREEP RESISTANT WELD METAL FOR ARC WELDING OF THIN WALLED STEEL MEMBERS

(71) Applicant: LINCOLN GLOBAL, INC., Santa Fe Springs, CA (US)

(72) Inventor: Stefano Sorrentino, Rome (IT)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 776 days.

(21) Appl. No.: 16/577,907

(22) Filed: Sep. 20, 2019

(65) Prior Publication Data

US 2021/0086314 A1    Mar. 25, 2021

(51) Int. Cl.
*B23K 35/30* (2006.01)
*C21D 10/00* (2006.01)
(Continued)

(52) U.S. Cl.
CPC .......... *B23K 35/3086* (2013.01); *B23K 9/173* (2013.01); *B23K 9/186* (2013.01);
(Continued)

(58) Field of Classification Search
CPC ............ B23K 35/3086; B23K 2103/04; C22C 38/001; C22C 38/002; C22C 38/04;
(Continued)

(56) References Cited

U.S. PATENT DOCUMENTS 5,704,765 A    1/1998  Amos et al.
6,379,821 B2   4/2002  Kushida et al.
(Continued)

FOREIGN PATENT DOCUMENTS

CN    103464931 A  * 12/2013
CN    106425156 A    2/2017
(Continued)

OTHER PUBLICATIONS

Hasegawa et al., JP-08187592-A google patent translation printed Aug. 8, 2022, Jul. 23, 1996, entire translation (Year: 1996).*
(Continued)

*Primary Examiner* — Humera N. Sheikh
*Assistant Examiner* — Katherine A Christy
(74) *Attorney, Agent, or Firm* — VORYS, SATER, SEYMOUR & PEASE

(57) ABSTRACT

Steel weld metal compositions can include from 9.00 to 12.00 wt % chromium, from 0.02 to 0.06 wt % carbon, from 0.3 to 0.7 wt % manganese, from 0.1 to 0.3 wt % silicon, from 0.5 to 1.2 wt % nickel, from 0.1 to 0.5 wt % molybdenum, from 1.0 to 1.5 wt % cobalt, from 0.03 to 0.08 wt % niobium, from 0.2 to 0.8 wt % tungsten, from 0.3 to 0.8 wt % copper, from 0.005 to 0.010 wt % boron, and from 0.005 to 0.025 wt % nitrogen; wherein the balance of the steel weld metal composition is iron and unavoidable impurities. Methods of depositing the steel weld metal compositions on a workpiece by an electric arc welding process are also described without the use of a post weld heat treatment. Consumable electric arc welding electrodes producing high chromium creep resistant steel weld metal compositions are also described.

15 Claims, 1 Drawing Sheet

(51) Int. Cl.

| | |
|---|---|
| C22C 38/00 | (2006.01) |
| C22C 38/02 | (2006.01) |
| C22C 38/04 | (2006.01) |
| C22C 38/42 | (2006.01) |
| C22C 38/44 | (2006.01) |
| C22C 38/48 | (2006.01) |
| C22C 38/52 | (2006.01) |
| C22C 38/54 | (2006.01) |
| B23K 103/04 | (2006.01) |
| B23K 9/173 | (2006.01) |
| B23K 9/18 | (2006.01) |
| B23K 9/29 | (2006.01) |

(52) U.S. Cl.
CPC .............. *B23K 9/295* (2013.01); *C21D 10/00* (2013.01); *C22C 38/001* (2013.01); *C22C 38/02* (2013.01); *C22C 38/04* (2013.01); *C22C 38/42* (2013.01); *C22C 38/44* (2013.01); *C22C 38/48* (2013.01); *C22C 38/52* (2013.01); *C22C 38/54* (2013.01); *B23K 2103/04* (2018.08); *C21D 2211/008* (2013.01)

(58) Field of Classification Search
CPC ......... C22C 38/42; C22C 38/48; C22C 38/46; C22C 38/50; C22C 38/52; C22C 38/54; C21D 2211/008; C21D 10/00
USPC ............................................. 428/544
See application file for complete search history.

(56) References Cited

U.S. PATENT DOCUMENTS

| | | | |
|---|---|---|---|
| 9,556,503 | B1 | 1/2017 | Hawk et al. |
| 2005/0257853 | A1 | 11/2005 | Yamashita et al. |
| 2011/0162764 | A1 | 7/2011 | Kim et al. |
| 2013/0309003 | A1 | 11/2013 | Nako et al. |
| 2014/0203008 | A1 | 7/2014 | Chen et al. |
| 2017/0165793 | A1* | 6/2017 | Fiore .................. B23K 35/0266 |
| 2017/0355038 | A1 | 12/2017 | Suzuki et al. |
| 2020/0306896 | A1* | 10/2020 | Ikai ........................ C22C 38/005 |

FOREIGN PATENT DOCUMENTS

| | | | |
|---|---|---|---|
| EP | 1 621 643 A1 | 2/2006 | |
| EP | 1112804 B1 | 8/2006 | |
| EP | 3269831 A1 | 1/2018 | |
| JP | 63013692 A * | 1/1988 | ......... B23K 35/3086 |
| JP | 08187592 A * | 7/1996 | |
| JP | H10-291090 A | 11/1998 | |
| JP | 2000-301377 A | 10/2000 | |
| JP | 2001107141 A | 4/2001 | |
| JP | 2001294992 A | 10/2001 | |
| JP | 2002060910 A | 2/2002 | |
| JP | 2004042116 A * | 2/2004 | |
| JP | 3543740 B2 | 7/2004 | |
| JP | 2004255399 A | 9/2004 | |
| JP | 3576472 B2 | 10/2004 | |
| JP | 3938068 B2 | 6/2007 | |
| JP | 2010227949 A | 10/2010 | |
| KR | 20180089310 A * | 8/2018 | |
| WO | 9822255 A1 | 5/1998 | |

OTHER PUBLICATIONS

Hirata, JP 2000301377 A google patent translation printed Aug. 8, 2022, Oct. 31, 2000, entire translation (Year: 2000).*
Lorenzo et al., "The relationship between the Uniaxial Creep Test and the Small Punch Creep Test of the AZ31 magnesium alloy", Sep. 22, 2014, Materials Science and Engineering (Year: 2014).* W1 continued: URL: <,URL: <https://www.sciencedirect.com/science/article/pii/S0921509314009204#:~:text=While%20in%20conventional%20creep%20tes>, pp. 319-325 (Year: NA) (Year: NA) (Year: NA).*
Kral et al., "Creep Resistance of S304H Austenitic Steel Processed by High-Pressure Sliding", Jan. 3, 2022, URL: <https://www.ncbi.nlm.nih.gov/pmc/articles/PMC8746042/pdf/materials-15-00331.pdf>, pp. 1-15 (Year: 2022).*
Welding Academy, What Is . . . MIG/MAG Welding, Apr. 2, 2019, URL: <https://blog.perfectwelding.fronius.com/en/what-is-mig-mag-welding/#:~:text=MAG%20welding%20stands%20for%20metal,gas%20for%20the%20weld%20pool.>, pp. 1-8 (Year: 2019).*
Liu et al., CN103464931 A google patent translation printed Aug. 8, 2022, Dec. 25, 2013, entire translation (Year: 2013).*
Yasutaka et al., KR20180089310A google patent translation printed Aug. 9, 2022, Aug. 8, 2018, entire translation (Year: 2018).*
Ogawa etal., JP63013692A machine translation printed Nov. 3, 2022, Jan. 20, 1988, entire translation (Year: 1988).*
Goto et al., JP 2004042116 A google patents machine translation printed Aug. 9, 2022, Feb. 12, 2004, entire translation (Year: 2004).*
WeldingAcademy,What Is . . . MIG/MAG Welding, Apr. 2, 2019, URL: <https://olog.perfectwelding.fronius.com/en/what-is-mig-mag-welding/#:~:text=MAG%20welding%20stands%20for%20metal,gas%20for%20the%20weld%20pool.>, pp. 1-8 (Year: 2019).*
Extended European Search Report from Corresponding Application No. 20197212.2; dated Feb. 19, 2021; pp. 1-7.
Specification for Low-Alloy Steel Electrodes for Shielded Metal Arc Welding, 10th Edition, 2014, ISBN: 978-0-87171-850-1, American Welding Society.
Di Gianfrancesco et al., "New Creep Resistant Stable Steel for USC Power (CRESTA)", European Commission Research Fund for Coal and Steel, 2014, EUR 26415 EN, RFCS Publications.
Scott et al., "Examination of Stress Corrosion Cracks in Alloy 182 Weld Metal After Exposure to PWR Primary Water", Proceedings of the International Conference On Environmental Degradation of Materials In Nuclear Power Systems: Water Reactors, 2005, pp. 497-509; TMS; Warrendale, PA.
Abson et al., "Review of Type IV Cracking of Weldments in 9-12% Cr Creep Strength Enhanced Ferritic Steels", International Materials Reviews, Nov. 2013, pp. 437-473, 58(8).
Brett et al., "Weld Repair of Grade 91 Steel Without Post-Weld Heat Treatment", Materials Research Innovations, Apr. 25, 2013, pp. 312-317, vol. 17, 2013, Issue 5: Energy Materials (abstract) [online], [retrieved on Sep. 6, 2019]. Retrieved from the Internet <URL https://www.tandfonline.com/doi/full/10.1179/1432891713Z.000000000253.
Pramutadi et al., Study on Corrosion Properties of Welded Ferritic-Martensitic Steels in Liquid Lead-Bismuth at 600° C., Journal of Power and Energy Systems, 2011, pp. 69-76, vol. 5, No. 1.
Aloraier et al., "Weld Repair Practices Without Post Weld Heat Treatment for Ferritic Alloys and Their Consequences on Residual Stresses: A Review", International Journal of Pressure Vessels and Piping, Apr. 2010, pp. 127-133, vol. 87, Issue 4 (abstract)[online], [retrieved on Sep. 6, 2019]. Retrieved from the Internet <URL: https://www.sciencedirect.com/science/article/pii/S0308016110000219].
Falat et al., "Creep Deformation and Failure of E911/E911 and P92/P92 Similar Weld-Joints", Engineering Failure Analysis, Oct. 2009, pp. 2114-2120, vol. 16, Issue 7 (abstract)[online], [retrieved on Sep. 6, 2019]. Retrieved from the Internet <URL https://www.sciencedirect.com/science/article/abs/pii/S1350630709000296.
Rothwell et al., "Performance of Weldments in Advanced 9%Cr Steel", Paper presented at WELDS 2009 Design, testing, assessment and safety of high-temperature welded structures; Jun. 24-26, 2009; Fort Myers, FL.
Vaillant et al., "T/P23, 24, 911 and 92: New Grades for Advanced Coal-Fired Power Plants—Properties and Experience", International Journal of Pressure Vessels and Piping, Jan.-Feb. 2008, pp. 38-46, vol. 85, Issues 1-2 (abstract)[online], [retrieved on Sep. 6, 2019]. Retrieved from the Internet <URL https://www.sciencedirect.com/science/article/pii/S0308016107000646.
Oñoro, "Martensite Microstructure of 9-12%Cr Steels Weld Metals", Journal of Materials Processing Technology, Dec. 2006, pp. 137-142, vol. 180, Issues 1-3 (abstract) [retrieved on Sep. 6, 2019]. Retrieved from the Internet <URL https://www.sciencedirect.com/science/article/pii/S0924013606005553.

(56) References Cited

OTHER PUBLICATIONS

Ennis, "The Creep Rupture Behavior and Steam Oxidation Resistance of P92 Weldments", Materials at High Temperatures, 2006, pp. 187-193, vol. 23, Issue 3-4 (abstract) [retrieved on Sep. 6, 2019]. Retrieved from the Internet <URL https://www.tandfonline.com/doi/abs/10.1179/mht.2006.013.

Neubert et al., "Effect of Welding Technique on Weld Morphology and Hardness of Supermartensitic 13% Cr Steels", Materials Science and Technology, 2004, pp. 1551-1562, vol. 20, Issue 12 (abstract) [retrieved on Sep. 6, 2019]. Retrieved from the Internet <URL https://www.tandfonline.com/doi/abs/10.1179/026708304X6068.

Barnes et al., "The Effect of Composition on Microstructural Developments and Toughness of Weld Metals for Advanced High Temperature 9-13%Cr Steel", Paper presented at the 2nd International Conference on Integrity of High Temperature Welds, Nov. 10-12, 2003, Institute of Materials, London.

Kopeliovich, "Creep Resistant Steels", (Undated), SubsTech [online][retrieved on Sep. 6, 2019]. Retrieved from the Internet <URL http://www.substech.com/dokuwiki/doku.php?id=creep_resistant_steels.

\* cited by examiner

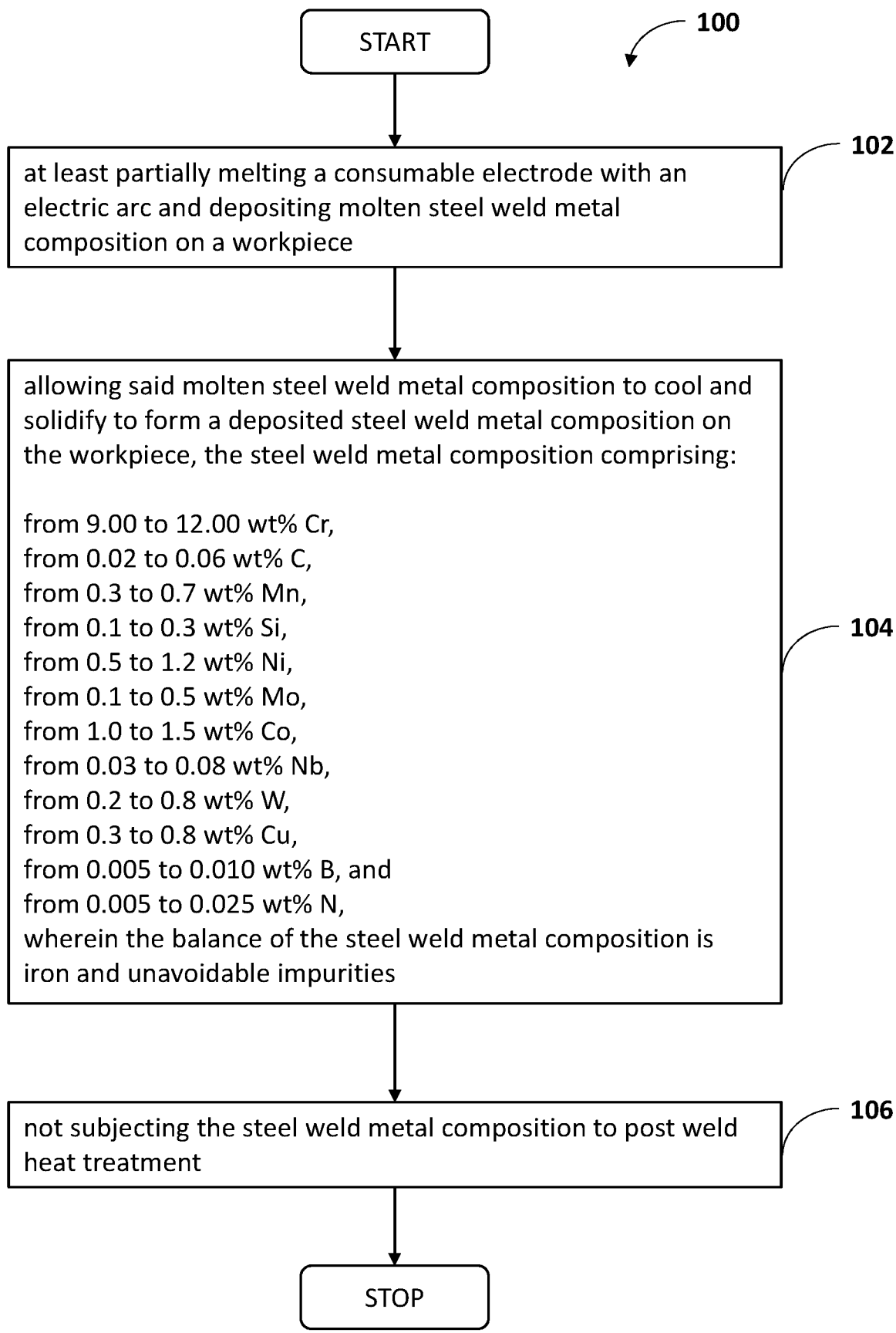

HIGH CHROMIUM CREEP RESISTANT WELD METAL FOR ARC WELDING OF THIN WALLED STEEL MEMBERS

FIELD OF THE INVENTION

High chromium creep resistant steel weld metal compositions are provided. Also provided are methods for depositing high chromium creep resistant steel weld metal compositions on workpieces by electric arc welding processes without the use of a post weld heat treatment (PWHT). Also provided are consumable electric arc welding electrodes producing high chromium creep resistant steel weld metal compositions.

BACKGROUND

Martensitic high chromium steel materials are widely used in the power generation industry or chemical and petrochemical industry. In particular, bainitic and martensitic Cr steels are used in thin-walled boiler membrane walls. These components are subjected to high working temperatures and concomitant stress. The construction and repair of high chromium steels makes extensive use of arc welding followed by a post weld heat treatment (PWHT) for restoring sufficient ductility and impact strength in the welded joint. Welded joints must match the oxidation/corrosion resistance and creep strength of the parent steels. Further, PWHT of large welded structures, such as boiler membrane walls, is highly impractical, costly and time consuming.

Steel compositions having about 9 wt % of chromium content have been widely used for high temperature applications. However, these compositions suffer from insufficient oxidation resistance in steam atmospheres at temperatures above 620° C., which is limiting their application temperature range significantly. Especially in boiler components with heat transfer, the oxide scale acts as a thermal insulator thereby increasing the metal temperature and consequently reducing the lifetime of corresponding components. Additionally, the oxide scales, if spalled off during operation, will cause erosion damage on the following steam carrying components. Spalled oxide scales may cause blockage, impeding the steam flow often resulting in local overheating and catastrophic failure.

Elevated chromium contents, i.e. containing more than 9 wt % of chromium, are essential for good steam oxidation resistance. A content of about 11-12% of chromium is currently regarded to allow working temperatures up to 650° C., raising significantly the power plant efficiency. However, such chromium contents increase the driving force for Z-phase formation. Z-phase is a complex nitride that coarsens quickly thereby consuming the surrounding strengthening MX precipitates, mainly contributing to the creep strength of 9-12% Cr steels (M being: niobium or vanadium and X being: carbon or nitrogen). Elevated chromium contents also enhance the coarsening rate of chromium carbide precipitates. Both, the loss of the microstructure stabilizing effect of MX and chromium carbide precipitates are responsible for the drop in the long-term creep rupture strength of martensitic (with Cr>11%) high chromium heat-resistant steel grades.

Creep behavior and degradation of creep properties of high-temperature materials limit the lives of components and structures designed to operate for long periods under stress at elevated temperatures. Creep is a time-dependent deformation of a material under an applied load which most often occurs at elevated temperature. Structural changes in the material usually accelerate the creep, which in turn accelerates the rate of appearance of intergranular creep damage. Creep terminates in rupture when unabated and has a significant impact on component lifetime.

In view of the limitation of chromium content in martensitic steel compositions that can be used for welding steel members requiring high working temperatures, oxidation and corrosion resistance, and creep strength, there is a need for high chromium steel used for thin walled welded construction in power engineering applications. Moreover, such high Cr steel should be suitable to use in as-welded condition (avoiding PWHT).

SUMMARY

High chromium creep resistant steel weld metal compositions to be used with no post weld heat treatment (PWHT) are provided. Also provided are methods for depositing high chromium creep resistant steel weld metal compositions on workpieces by electric arc welding processes.

In one embodiment, a steel weld metal composition comprising from 9.00 to 12.00 wt % chromium (Cr), from 0.02 to 0.06 wt % carbon C, from 0.3 to 0.7 wt % manganese (Mn), from 0.1 to 0.3 wt % silicon (Si), from 0.5 to 1.2 wt % nickel (Ni), from 0.1 to 0.5 wt % molybdenum (Mo), from 1.0 to 1.5 wt % cobalt (Co), from 0.03 to 0.08 wt % niobium (Nb), from 0.2 to 0.8 wt % tungsten (W), from 0.3 to 0.8 wt % copper (Cu), from 0.005 to 0.010 wt % boron (B), and from 0.005 to 0.025 wt % nitrogen (N); wherein the balance of the steel weld metal composition is iron (Fe) and unavoidable impurities.

In another embodiment, a method of depositing a steel weld metal composition on a workpiece by an electric arc welding process comprising a) at least partially melting a consumable electrode with an electric arc and depositing molten steel weld metal composition on the workpiece; and b) allowing said molten steel weld metal composition to cool and solidify to form a deposited steel weld metal composition on the workpiece, the steel weld metal composition comprising from 9.00 to 12.00 wt % Cr, from 0.02 to 0.06 wt % C, from 0.3 to 0.7 wt % Mn, from 0.1 to 0.3 wt % Si, from 0.5 to 1.2 wt % Ni, from 0.1 to 0.5 wt % Mo, from 1.0 to 1.5 wt % Co, from 0.03 to 0.08 wt % Nb, from 0.2 to 0.8 wt % W, from 0.3 to 0.8 wt % Cu, from 0.005 to 0.010 wt % B and from 0.005 to 0.025 wt % N; wherein the balance of the steel weld metal composition is Fe and unavoidable impurities, and wherein the steel weld metal composition is not subjected to PWHT.

BRIEF DESCRIPTION OF THE DRAWINGS

Certain embodiments of the present invention may take physical form in certain parts and arrangements of parts, a preferred embodiment of which will be described in detail in the specification and illustrated in the accompanying drawings which form a part hereof, and wherein:

FIG. 1 is a flow diagram of an exemplary, non-limiting embodiment of a method for depositing a steel weld metal composition on a workpiece by an electric arc welding process.

DETAILED DESCRIPTION

One embodiment of the present invention may include a steel weld metal composition, to be deposited by different consumables. Various welding methods may be used to deposit the consumable, such as shielded metal arc welding (SMAW), submerged-arc welding (SAW), gas tungsten arc welding (GTAW), gas metal arc welding (GMAW), flux-cored arc welding (FCAW) methods, and combinations thereof. The steel weld metal composition comprises iron (Fe), chromium (Cr), carbon (C), manganese (Mn), silicon (Si), nickel (Ni), molybdenum (Mo), cobalt (Co), niobium (Nb), tungsten (W), copper (Cu), boron (B), nitrogen (N) and potentially additional elements.

Another embodiment of the present invention may include a steel weld metal composition exhibiting good creep characteristic at ultralong durations and intended for elevated service temperatures and thin members. In one embodiment, the composition further exhibits excellent oxidation and corrosion resistance, including strength, toughness and the like. In one embodiment, the steel weld metal composition is intended for use without post weld heat treatment (PWHT). The steel weld metal composition may be included in a welded structure, e.g., thin walled members, having high chromium content that is creep resistant and may be used in the power generation industry or chemical and petrochemical industry where the structure is subjected to continuous service at high temperature.

Definitions and methods described herein are provided to better define the embodiments of the present invention and to guide those of ordinary skill in the art in the practice of the embodiments. Unless otherwise noted, terms are to be understood according to conventional usage by those of ordinary skill in the relevant art.

Unless otherwise indicated, all numbers expressing quantities of ingredients, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more embodiments and can cover other unlisted embodiments.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present invention and does not pose a limitation on the scope of the present invention otherwise claimed. No language in the specification should be construed as indicating that any non-claimed element is essential to the practice of the present invention.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Having described the embodiments in detail, it will be apparent that modifications, variations, and equivalent embodiments are possible without departing the scope of the embodiments defined in the appended claims. Furthermore, it should be appreciated that all examples in the embodiments are provided as non-limiting examples.

Additional features or elements of the embodiments will become better understood with reference to the accompanying description and claims.

Steel Weld Metal Composition

Chromium:

Chromium is an essential element for improving the creep rupture strength of steel by stabilization of inartensite and is also added to give the steel a satisfactory level of hot corrosion (oxidation) resistance. Chromium is also a major constituent in the formation of carbides as well as dissolving in the matrix as it is an essential element in the formation of a stable oxide scale for sustained high-temperature oxidation resistance. In certain embodiments, the chromium content of the steel weld metal composition may be from 9.00 to 12.00 wt %. Such content results, upon cooling from the molten state at any cooling rate of practical interest in arc welding, in a steel martensitic structure.

Carbon:

Carbon is an essential strengthening element and can combine with Cr, Mo, V, Ta, N and Nb to form carbide/carbonitride phases. With increased carbon content, the applicability for high temperature service is decreased. Additionally, a high amount of carbon increases the volume fraction of carbides/carbonitriders, decreasing the ductility of the steel and increasing the hardness to an undesirable level, thereby degrading formability and weldability. Carbon at too low a level lead to a soft untempered martensite with low strength. In certain embodiments, the carbon content of the steel weld metal composition may be from 0.02 to 0.06 wt %.

Manganese:

Manganese is an effective deoxidation element. It improves hot formability and facilitates the removal of impurities such as phosphorus and sulfur during melting. It ties up sulfur and reduces the ferrite formation. In certain embodiments, the manganese content of the steel weld metal composition may be from 0.3 to 0.7 wt %.

Silicon:

Silicon is a deoxidizing agent, to improve the weldability, and to increase resistance to steam oxidation. Silicon at elevated levels reduces high temperature strength, and in particular, creep rupture strength. Silicon also preferentially segregates at grain boundaries, reducing the toughness. In certain embodiments, the silicon content of the steel weld metal composition may be from 0.1 to 0.3 wt %.

Nickel:

Nickel stabilizes the martensitic structure and suppresses the formation of ferrite. It improves the toughness, however, higher nickel contents may reduce creep resistance. Additionally, increases in nickel content have a significant impact on cost. In certain embodiments, the nickel content of the steel weld metal composition may be from 0.5 to 1.2 wt %.

Molybdenum:

Molybdenum is responsible for solid solution strengthening and also improves creep rupture strength. Molybdenum is also a ferrite stabilizing element. Addition of molybdenum must be carefully controlled. High contents of molybdenum may deteriorate toughness and induce an increase of the ferrite content during service lifetimes in high temperature environments. Furthermore, high concentrations of molybdenum can be difficult to homogenize effectively, which further inhibits the ability to obtain positional control of chemistry. In certain embodiments, the molybdenum content of the steel weld metal composition may be from 0.1 to 0.5 wt %.

Cobalt:

Cobalt is an austenite stabilizing element in the steel and useful in limiting the retention of detrimental delta ferrite at low temperature. It increases the creep rupture strength through solid solution strengthening. Cobalt at low levels has the effect of enhancing resistance to temper softening. Conversely, high amounts of cobalt may induce embrittlement due to enhanced precipitation of intermetallic phases during high temperature operation. High concentrations of Co can be hard to homogenize, which inhibits the ability to obtain positional control of chemistry. In certain embodiments, the cobalt content of the steel weld metal composition may be from 1.0 to 1.5 wt %.

Niobium:

Niobium combines with carbon (and nitrogen) to form fine precipitates such as NbC which are effective to improve creep rupture strength. Additionally, niobium-rich precipitates refine the steel grain structure and aid to prevent grains of austenite from coarsening excessively during the austenizing heat treatment. If too low amounts of niobium are added, the volume fraction of precipitates is low and the effect as noted is minimal. However, increasing niobium content may suppress the precipitation of other nitrides, decreasing the vanadium precipitates which are effective for creep rupture resistance and consuming carbon in the matrix, thereby reducing the martensitic lath number density as well as the number density of other carbide precipitates such as $M_{23}C_6$ and decreasing the long-term creep rupture resistance. Furthermore, high niobium content can promote primary carbide formation, the size of which can be excessively large, thereby promoting microstructural damage in service. High concentrations of niobium can also be hard to homogenize which inhibits the ability to obtain positional control of chemistry. Niobium added in small quantity can dissolve in vanadium nitride, consequently improving the stability of the vanadium nitride. In certain embodiments, the niobium content of the steel weld metal composition may be from 0.03 to 0.08 wt %.

Tungsten:

Tungsten is a solution strengthener. Tungsten is incorporated in carbides and contributes to creep strength enhancement and long term stability. However, this element is expensive and high amounts may lead to strong segregation during steel making and casting process and may result in the formation of intermetallic phases that lead to significant embrittlement. In certain embodiments, the tungsten content of the steel weld metal composition may be from 0.2 to 0.8 wt %.

Copper:

Copper is an austenite stabilizer, and may be added to effectively stabilize a martensitic structure after quenching. Copper suppresses detrimental delta ferrite and may be advantageous to provide matrix strengthening by substitution as well as precipitate strengthening in the form of a copper-rich FCC phase. In certain embodiments, the copper content of the steel weld metal composition may be from 0.3 to 0.8 wt %.

Boron:

Boron stabilizes the carbide precipitates by inhibiting coarsening of the carbides. Boron also segregates at boundaries, reinforcing the boundaries and enhancing creep resistance at a high temperature. High amounts of boron require higher austenization temperatures be used to adequately disperse the boron within the steel, which in turn leads to an increase in the grain size, thereby degrading mechanical properties such as ductility and toughness through the formation of coarse boron nitride phase. Further, high amounts of boron adversely affect hot workability. In certain embodiments the boron content of the steel weld metal composition may be from 0,005 to 0.010 wt %.

The components of the steel weld metal composition are described above, and the remainder or balance includes iron and unavoidable impurities. The unavoidable impurities may include elements (for example, P, S and the like) that are allowed to be trapped in the weld metal depending on conditions, including raw materials, resources, and manufacturing equipment.

In one embodiment, the steel weld metal composition may comprise about 11 wt % Cr and possess excellent oxidation and corrosion properties above 620° C. and up to 650° C. exceeding steels for membrane walls tubing having nominal 2.25 wt % Cr (ASME T23, T24) and 9 wt % type (ASME T91), which are limited to use at up to 580-620° C. Further, in certain embodiments, the steel weld metal composition possesses short term static tensile properties that exceed existing chromium containing martensitic steels. Additionally, in another embodiment, the steel weld metal composition is designed to be used without PWHT on thin steel tubes (e.g., small bore hollow tubulars) and possess the same or similar creep strength and oxidation and corrosion resistance as the welded thin steel tubes. The steel weld metal composition possesses a high hardenability and, as such, the response to variations of the welding parameters is minimal, thus resulting in an improved weldability compared to T23 and T24 grades.

In another embodiment, the steel weld metal composition may comprise from about 10.50 to about 11.50 wt % Cr, from about 0.03 to about 0.05 wt % C, from about 0.4 to about 0.6 wt % Mn, from about 0.15 to about 0.25 wt % Si, from about 0.8 to about 1.0 wt % Ni, from about 0.2 to about 0.4 wt % Mo, from about 1.1 to about 1.4 wt % Co, from about 0.04 to about 0.07 wt % Nb, from about 0.3 to 0.7 wt % W, from about 0.4 to about 0.7 wt % Cu, from about 0.006 to about 0.009 wt % B, and from about 0.005 to 0.025 wt % N; wherein the balance of the steel weld metal composition is iron and unavoidable impurities.

In another embodiment, the steel weld metal composition may comprise from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities.

In another embodiment, the steel weld metal composition may comprise 11.0 wt % chromium, 0.04 wt % carbon, 0.5 wt % manganese, 0.2 wt % silicon, 0.9 wt % nickel, 0.3 wt % molybdenum, 1.3 wt % cobalt, 0.05 wt % niobium, 0.5 wt % tungsten, 0.6 wt % copper, 0.008 wt % boron and 0.0230 wt % nitrogen; wherein the balance of the steel weld metal composition is iron and unavoidable impurities.

In another embodiment, the steel weld metal composition has a low carbon untempered martensite microstructure.

In addition, in another embodiment, the steel weld metal composition is creep resistant at elevated temperature. In particular, in one embodiment, the steel weld metal composition has a uni-axial creep strength, at a temperature of 650° C., of at least 300 hours at 100 MPa, of at least 600 hours at 90 MPa, of at least 1500 hours at 70 MPa, and of at least 2500 hours at 55 MPa.

More particularly, in certain embodiments, the steel weld metal composition has a uni-axial creep strength, at a temperature of 650° C., of at least 330 hours at 100 MPa, of at least 610 hours at 90 MPa, of at least 1600 hours at 70 MPa, and of at least 2800 hours at 55 MPa.

More particularly, in certain embodiments, the steel weld metal composition has a uni-axial creep strength, at a temperature of 650° C., of 336 hours at 100 MPa, of 619 hours at 90 MPa, of 1609 hours at 70 MPa, and of at least 2879 hours at 55 MPa. As such, in certain embodiments, the creep resistance of the weld metal composition equals or exceeds existing compositions comprising only 2.25 wt % Cr.

In one embodiment, the deposited steel weld metal composition may have a uni-axial creep resistance of at least 5000 hours at a temperature of 620° C. More particularly, the deposited steel weld metal composition may have a uni-axial creep resistance of at least 10000 hours at a temperature of 620° C.

In one embodiment, the steel weld metal composition has an impact toughness of at least 27J at 20° C. As such, in one embodiment, the impact toughness of the steel weld metal composition exceeds the applicable requirements set in ANSI, ASME, EPRI, EN, TUV codes, standards and recommended practices.

In another embodiment, the steel weld metal composition has a Vickers hardness of not more than 360 VHN.

Method of Depositing a Steel Weld Metal Composition

In one embodiment, as shown in FIG. 1, a method 100 of depositing a steel weld metal composition on a workpiece by an electric arc welding process is provided. In one embodiment, the method includes the step 102 of at least partially melting a consumable electrode with an electric arc and depositing molten steel weld metal composition on the workpiece; and the step 104 of allowing said molten steel weld metal composition to cool and solidify to form a deposited steel weld metal composition on the workpiece, the steel weld metal composition comprising: from about 10.50 to about 11.50 wt % Cr, from about 0.03 to about 0.05 wt % C, from about 0.4 to about 0.6 wt % Mn, from about 0.15 to about 0.25 wt % Si, from about 0.8 to about 1.0 wt % Ni, from about 0.2 to about 0.4 wt % Mo, from about 1.1 to about 1.3 wt % Co, from about 0.04 to about 0.07 wt % Nb, from about 0.3 to about 0.7 wt % W, from about 0.4 to about 0.7 wt % Cu, from about 0.006 to about 0.009 wt % B, and from about 0.005 to 0.025 wt % N; wherein the balance of the steel weld metal composition is iron and unavoidable impurities; and wherein the steel weld metal composition is not subjected 106 to post weld heat treatment (PWHT).

In another embodiment, a method of depositing a steel weld metal composition on a workpiece by an electric arc welding process is provided. In one embodiment, the method includes at least partially melting a consumable electrode with an electric arc and depositing molten steel weld metal composition on the workpiece; and allowing said molten steel weld metal composition to cool and solidify to form a deposited steel weld metal composition on the workpiece, the steel weld metal composition comprising: from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities; and wherein the steel weld metal composition is not subjected to PWHT.

In one embodiment, a method of depositing a steel weld metal composition on a workpiece by an electric arc welding process is provided. In one embodiment, the method includes at least partially melting a consumable electrode with an electric arc and depositing molten steel weld metal composition on the workpiece; and allowing said molten steel weld metal composition to cool and solidify to form a deposited steel weld metal composition on the workpiece, the steel weld metal composition comprising: 11.0 wt % chromium, 0.04 wt % carbon, 0.5 wt % manganese, 0.2 wt % silicon, 0.9 wt % nickel, 0.3 wt % molybdenum, 1.3 wt % cobalt, 0.05 wt % niobium, 0.5 wt % tungsten, 0.6 wt % copper, 0.008 wt % boron, and 0.0230 wt % nitrogen; wherein the balance of the steel weld metal composition is iron and unavoidable impurities; and wherein the steel weld metal composition is not subjected to PWHT In certain embodiments, the presently disclosed methods may also include selecting the workpiece. In the method according to certain embodiments, the deposited steel weld metal composition has a martensite microstructure.

In addition, in methods according to certain embodiments, the steel weld metal composition a uni-axial creep strength, at a temperature of 650° C., of at least 300 hours at 100 MPa, of at least 600 hours at 90 MPa, of at least 1500 hours at 70 MPa, and of at least 2500 hours at 55 MPa.

More particularly, in methods according to certain embodiments, the steel weld metal composition has a uni-axial creep strength, at a temperature of 650° C., of at least 330 hours at 100 MPa, of at least 610 hours at 90 MPa, of at least 1600 hours at 70 MPa, and of at least 2800 hours at 55 MPa.

More particularly, in methods according to certain embodiments, the steel weld metal composition has a uni-axial creep strength, at a temperature of 650° C., of 336 hours at 100 MPa, of 619 hours at 90 MPa, of 1609 hours at 70 MPa, and of at least 2879 hours at 55 MPa.

In methods according to certain embodiments, the deposited steel weld metal composition may have a uni-axial creep resistance of at least 5000 hours at a temperature of 620° C. More particularly, in the method according to one embodiment, the deposited steel weld metal composition may have a uni-axial creep resistance of at least 10000 hours at a temperature of 620° C.

In methods according to certain embodiments, the steel weld metal composition has an impact toughness of at least 27J at 20° C.

In methods according to certain embodiments, the steel weld metal composition has a Vickers hardness of not more than 360 VHN.

A method of depositing a steel weld metal composition may comprise any arc welding method. For example, shielded metal arc welding (SMAW), submerged-arc welding (SAW), gas tungsten arc welding (GTAW), gas metal arc welding (GMAW), flux-cored arc welding (FCAW) methods, and combination thereof, may be used.

The welding conditions and welding material components may be appropriately controlled according to methods known in the art.

In one embodiment, a steel weld metal composition deposited under the above conditions exhibits beneficial creep characteristics at ultralong durations and elevated service temperatures as well as other beneficial characteristics, including impact toughness, oxidation resistance, corrosion resistance, strength, and hardness. Further, a weld structure including such a weld metal can be achieved without the use of PWHT.

Consumable Electric Arc Welding Electrodes

In one embodiment, a consumable electric arc welding covered electrode for the SMAW (MMA) method is provided. The consumable electric arc welding covered electrode comprises: a steel metallic core, and an external coating containing metal powders, ferroalloys, oxides, slag formers, binders, extrusion aids, fluxing ingredients, gas formers and deoxidizers, being present in such amounts that the electrode produces a steel weld metal composition comprising: from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities.

In another embodiment, a consumable electric arc welding wire electrode for FCAW method is provided. The consumable electric arc welding wire electrode comprises: an external steel metal sheath, and a core surrounded by the sheath comprising metal powders, ferroalloys, oxides, slag formers, binders, fluxing ingredients, gas formers and deoxidizers, being present in such amounts that the wire electrode produces the steel weld metal composition comprising: from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities.

In another embodiment, a consumable electric arc welding wire electrode for the GMAW method, made of steel having a composition comprising: from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities.

In another embodiment, a consumable electric arc welding wire or rod for the GTAW method, made of steel having a composition comprising: from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities.

In another embodiment, a consumable electric arc welding wire electrode used in combination with an agglomerated flux for the SAW method is provided. The consumable electric arc welding wire electrode and flux combinations comprises: a solid or a flux cored steel metal wire, and an agglomerated flux containing silicates, oxides, carbonates, fluorite, metallic powders, ferroalloys, being present in such amounts that the wire electrode and flux combination produces the steel weld metal composition comprising: from about 10.75 to about 11.25 wt % Cr, from about 0.035 to about 0.045 wt % C, from about 0.45 to about 0.55 wt % Mn, from about 0.15 to about 0.25 wt % Si, from about 0.85 to about 0.95 wt % Ni, from about 0.25 to about 0.35 wt % Mo, from about 1.2 to about 1.35 wt % Co, from about 0.04 to about 0.06 wt % Nb, from about 0.4 to about 0.6 wt % W, from about 0.5 to about 0.65 wt % Cu, from about 0.007 to about 0.009 wt % B, and from about 0.005 to 0.025 wt % N; wherein the balance of the steel weld metal composition is iron and unavoidable impurities.

One or more illustrative embodiments have been presented herein. Not all features of a physical implementation are described or shown in this application for the sake of clarity. It is understood that in the development of a physical embodiment incorporating the features of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art.

While methods are described herein in terms of "comprising" various components or steps, the methods can also "consist essentially of" or "consist of" the various components and steps.

To facilitate a better understanding of the embodiments of the present invention, the following examples of preferred or representative features are given. In no way should the following examples be read to limit, or to define, the scope of the embodiments.

EXAMPLES

The following non-limiting examples are provided to further illustrate the embodiments of the present invention. It should be appreciated by those of skill in the art that the techniques disclosed in the examples that follow represent approaches the inventors have found function well in the practice of the embodiments of the present invention, and thus can be considered to constitute examples of modes for its practice. However, those of skill in the art should, in light of the embodiments of the present invention, appreciate that many changes can be made in the specific embodiments that are disclosed and still obtain a like or similar result without departing from the spirit and scope of the embodiments.

Example 1

A chemical composition of weld metal is shown in Table 1 (quantities are given in wt %).

TABLE 1

| C | Si | Mn | Cr | Mo | Nb | Cu | Co | Ni | W | B | N |
|---|----|----|----|----|----|----|----|----|---|---|---|
| 0.04 | 0.2 | 0.5 | 11 | 0.3 | 0.05 | 0.6 | 1.2 | 0.9 | 0.5 | 0.008 | 0.0230 |

Remainder: iron and unavoidable impurities.

The composition was melted and deposited on a workpiece. meeting AWS 5.5 standard geometry by the SMAW method, using a 4 mm-diameter low hydrogen stick electrode and 250° C. preheating/interpass temperature.

The deposited molten composition was allowed to cool and to solidify on the workpiece. No PWHT is carried out.

The weld metal composition had the following properties:

Structure of composition (without PWHT): low carbon untempered martensite.

Uni-axial creep strength under various stress conditions

| Temperature (° C.) | 650 | 650 | 650 | 650 |
|---|---|---|---|---|
| Stress (MPa) | 100 | 90 | 70 | 55 |
| Uni-axial creep strength (hours) | 336 | 619 | 1609 | 2879 |

The impact toughness of the steel weld metal composition has was measured at >27J at 20° C. (exceeding applicable requirements set in ANSI, ASME, EPRI, EN, TUV codes, standards and recommended practices).

The Vickers Hardness of the Steel Weld Metal Composition was <360 VHN.

The particular embodiments disclosed above are illustrative only, as these embodiments may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The embodiments illustratively disclosed herein suitably may be practiced in the absence of any element that is not specifically disclosed herein and/or any optional element disclosed herein. Also, the terms in the claims have their plain, ordinary meaning unless otherwise explicitly and clearly defined by the patentee.

The work leading to this invention has received funding from the European Union's Research Fund for Coal and Steel (RFCS) research programme under grant agreement RFSR-CT-2014-00032.

What is claimed is:

1. A steel weld metal composition consisting of:
   from 11.00 to 12.00 wt % Cr,
   from 0.02 to 0.06 wt % C,
   from 0.3 to 0.7 wt % Mn,
   from 0.1 to 0.3 wt % Si,
   from 0.5 to 1.2 wt % Ni,
   from 0.1 to 0.5 wt % Mo,
   from 1.0 to 1.5 wt % Co,
   from 0.03 to 0.08 wt % Nb,
   from 0.2 to 0.4 wt % W,
   from 0.3 to 0.8 wt % Cu,
   from 0.005 to 0.010 wt % B,
   from 0.005 to 0.025 wt % N,
   wherein the balance of the steel weld metal composition is iron and unavoidable impurities, and
   wherein the composition has a uni-axial creep resistance of at least 2500 hours at a temperature of 650° C. at 55 MPa.

2. The steel weld metal composition of claim 1, wherein the content of Cr is 11 wt %.

3. The steel weld metal composition of claim 1, wherein the content of Mn is from 0.4 to 0.6 wt %.

4. The steel weld metal composition of claim 1, wherein the content of Ni is from 0.8 to 1.0 wt %.

5. The steel weld metal composition of claim 1, wherein the content of Mo is from 0.2 to 0.4 wt %.

6. The steel weld metal composition of claim 1, wherein the content of Co is from 1.1 to 1.3 wt %.

7. The steel weld metal composition of claim 1, wherein the content of Nb is from 0.04 to 0.07 wt %.

8. The steel weld metal composition of claim 1, wherein the content of Cu is from 0.4 to 0.7 wt %.

9. The steel weld metal composition of claim 1, wherein the content of B is from 0.006 to 0.009 wt %.

10. The steel weld metal composition of claim 1, wherein the composition has a martensite microstructure.

11. The steel weld metal composition of claim 1, wherein the composition has an impact toughness of at least 27J at 20° C. and/or has a Vickers Hardness of not more than 360.

12. A consumable electric arc welding covered electrode for the shielded metal arc welding (manual metal arc welding) method, comprising:
   a steel metallic core, and
   an external coating containing metal powders, ferroalloys, oxides, slag formers, binders, extrusion aids, fluxing ingredients, gas formers and deoxidizers,
being present in such amounts that the electrode produces the steel weld metal composition according to claim 1.

13. A consumable electric arc welding wire electrode for flux-cored arc welding method, comprising:
   an external steel metal sheath, and
   a core surrounded by the sheath, the core comprising metal powders, ferroalloys, oxides, slag formers, binders, fluxing ingredients, gas formers and deoxidizers, being present in such amounts that the wire electrode produces the steel weld metal composition according to claim 1.

14. A consumable electric arc welding wire or rod for the gas metal arc welding and/or the gas tungsten arc welding method, made of steel having the composition according to claim 1.

15. A consumable electric arc welding wire electrode used in combination with an agglomerated flux for the submerged-arc welding method, comprising:
   a solid or a flux cored steel metal wire, and
   an agglomerated flux containing silicates, oxides, carbonates, fluorite, metallic powders, ferroalloys, being present in such amounts that the electrode produces the steel weld metal composition according to claim 1.

\* \* \* \* \*